United States Patent
Jho

(10) Patent No.: US 8,576,254 B2
(45) Date of Patent: Nov. 5, 2013

(54) ELECTRONIC PICTURE FRAME AND IMAGE DISPLAY METHOD THEREOF

(75) Inventor: Soo-hyun Jho, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 879 days.

(21) Appl. No.: 12/370,257

(22) Filed: Feb. 12, 2009

(65) Prior Publication Data

US 2009/0309901 A1 Dec. 17, 2009

(30) Foreign Application Priority Data

Jun. 13, 2008 (KR) .................. 10-2008-0055771

(51) Int. Cl.
*G09G 5/14* (2006.01)
*G06F 3/0485* (2013.01)

(52) U.S. Cl.
CPC .................................. *G06F 3/0485* (2013.01)
USPC .......................................... 345/684; 345/163

(58) Field of Classification Search
CPC G06F 3/0485; G06F 3/04855; G06F 3/04845
USPC .................................................. 345/684, 163
See application file for complete search history.

(56) References Cited

U.S. PATENT DOCUMENTS

| | | | | |
|---|---|---|---|---|
| 5,963,204 A * | 10/1999 | Ikeda et al. | ................. | 715/723 |
| 6,834,130 B1 * | 12/2004 | Niikawa et al. | ................. | 382/305 |
| 7,099,559 B1 * | 8/2006 | Niikawa et al. | ................. | 386/252 |
| 7,149,370 B2 * | 12/2006 | Willner et al. | ................. | 382/305 |
| 2002/0093575 A1 * | 7/2002 | Kusaka | ................. | 348/233 |
| 2002/0139943 A1 * | 10/2002 | Matama | ................. | 250/559.45 |
| 2002/0191113 A1 * | 12/2002 | Siefken | ................. | 348/700 |
| 2003/0043282 A1 * | 3/2003 | Malloy Desormeaux | . | 348/231.3 |
| 2004/0109673 A1 * | 6/2004 | Yatabe et al. | ................. | 386/69 |
| 2004/0175764 A1 * | 9/2004 | Nishiyama et al. | ................. | 435/7.2 |
| 2004/0189687 A1 * | 9/2004 | Yamamoto | ................. | 345/716 |
| 2004/0190015 A1 * | 9/2004 | Uchida | ................. | 358/1.6 |
| 2004/0212735 A1 * | 10/2004 | Kitamura | ................. | 348/553 |
| 2005/0168763 A1 * | 8/2005 | Higuchi et al. | ................. | 358/1.13 |
| 2006/0164441 A1 * | 7/2006 | Wada et al. | ................. | 345/649 |
| 2006/0280497 A1 * | 12/2006 | Wakabayashi | ................. | 396/287 |
| 2006/0287058 A1 * | 12/2006 | Resnick et al. | ................. | 463/19 |
| 2007/0030360 A1 * | 2/2007 | Udono | ................. | 348/231.99 |
| 2007/0047821 A1 * | 3/2007 | Nonaka et al. | ................. | 382/224 |
| 2007/0097247 A1 * | 5/2007 | Yokokawa | ................. | 348/333.1 |
| 2007/0122064 A1 * | 5/2007 | Arima | ................. | 382/310 |
| 2007/0147774 A1 * | 6/2007 | Mori et al. | ................. | 386/83 |

(Continued)

FOREIGN PATENT DOCUMENTS

| | | |
|---|---|---|
| JP | 2006-078750 A | 3/2006 |
| JP | 2006-211078 A | 8/2006 |

(Continued)

*Primary Examiner* — Javid A Amini
(74) *Attorney, Agent, or Firm* — Sughrue Mion, PLLC

(57) ABSTRACT

An electronic picture frame and an image display method thereof are provided. In the electronic picture frame, a plurality of images are arranged and displayed on one side of a screen, and among the plurality of images, an image at a particular position is enlarged and displayed. Alternatively, a screen is divided into a plurality of sub-screens, so images stored in each of a plurality of storage areas can be displayed on a respective sub-screen. Accordingly, the images stored in the plurality of storage areas can be displayed on the electronic picture frame in diverse forms.

30 Claims, 6 Drawing Sheets

(56) References Cited

U.S. PATENT DOCUMENTS

| | | | |
|---|---|---|---|
| 2007/0160345 A1* | 7/2007 | Sakai et al. | 386/95 |
| 2007/0188787 A1* | 8/2007 | Aiso | 358/1.9 |
| 2007/0211159 A1* | 9/2007 | Hara et al. | 348/333.05 |
| 2008/0037901 A1* | 2/2008 | Yonezawa et al. | 382/291 |
| 2008/0212953 A1* | 9/2008 | Nagayama | 386/126 |
| 2008/0243893 A1* | 10/2008 | Suehiro | 707/101 |
| 2009/0135269 A1* | 5/2009 | Nozaki et al. | 348/222.1 |
| 2010/0192106 A1* | 7/2010 | Watanabe et al. | 715/838 |
| 2010/0241748 A1* | 9/2010 | Ansari et al. | 709/225 |
| 2010/0306800 A1* | 12/2010 | Jung et al. | 725/41 |
| 2011/0010667 A1* | 1/2011 | Sakai et al. | 715/810 |
| 2011/0090349 A1* | 4/2011 | Kojima | 348/207.2 |

FOREIGN PATENT DOCUMENTS

| | | |
|---|---|---|
| JP | 2007-116376 A | 5/2007 |
| JP | 2007-259485 A | 10/2007 |
| WO | 98-57491 | 12/1998 |
| WO | 01-29702 A2 | 4/2001 |

* cited by examiner

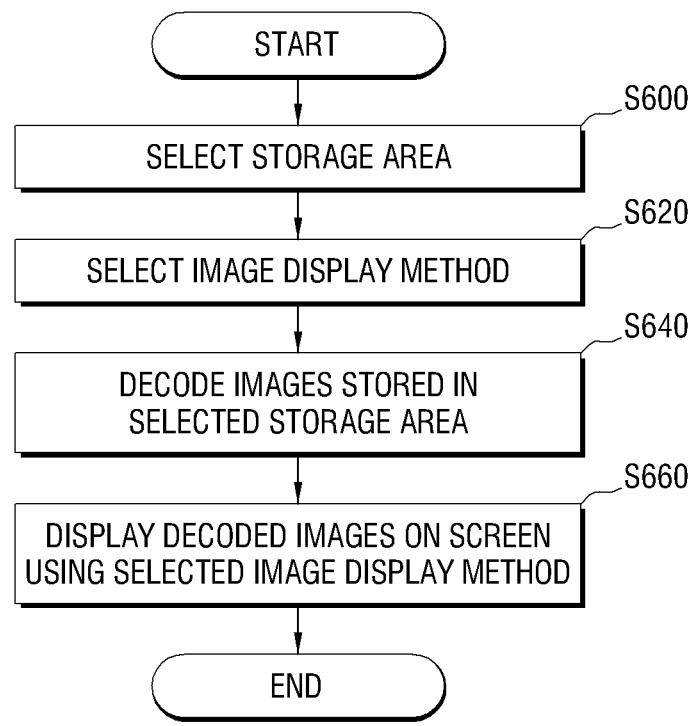

ELECTRONIC PICTURE FRAME AND IMAGE DISPLAY METHOD THEREOF

CROSS-REFERENCE TO RELATED APPLICATIONS

The application claims priority from Korean Patent Application No. 10-2008-0055771, filed on Jun. 13, 2008 in the Korean Intellectual Property Office, the disclosure of which is incorporated herein by reference in its entirety.

BACKGROUND OF THE INVENTION

1. Field of the Invention

Apparatuses and methods consistent with the present invention relate to an electronic picture frame and an image display method thereof, and more particularly, to an electronic picture frame which displays images stored in an external memory or an embedded memory on a display, and an image display method thereof.

2. Description of the Related Art

Electronic picture frames are devices for displaying still images or moving images stored in a memory on a screen. Conventional electronic picture frames display only a single image on a screen or display images stored in a single memory. That is, conventional electronic picture frames are limited in the extent to which they can display images on a screen. Accordingly, since such electronic picture frames provide only a simple function for displaying images, a user may be unable to watch images stored in a desired format in diverse kinds of memory, and therefore the electronic picture frames may be ineffective.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

An aspect of the present invention provides an electronic picture frame which implements an image display function with diverse forms and provides a user with images stored in diverse kinds of memories in an exciting and effective way so as to increase the effectiveness of the electronic picture frame and an image display method thereof.

According to an exemplary aspect of the present invention, there is provided an image display method for an electronic picture frame, the method including displaying a plurality of images on a first area of a screen, scrolling through the plurality of images on the screen, and displaying one of the plurality of images which are being scrolled through on a second area of the screen.

The plurality of images displayed on the first area may be thumbnail images which have a smaller size than the image displayed on the second area.

An image displayed at a preset position of the first area from among the plurality of images, which are being scrolled through, may be displayed on both the first area and the second area of the screen for a preset period of time.

The method may further include changing the number of images displayed on the first area according to a user command.

The images displayed on the first area may include images which have been displayed on the second area, and images which have not been displayed on the second area.

In displaying one of the plurality of images, which are being scrolled through, on the second area of the screen, an image at a particular position from among the plurality of images may be enlarged, moved to the second area, and displayed on the second area, and the process of enlarging and moving the image at the particular position is shown gradually.

The method may further include changing at least one of a direction and rate of scrolling through the plurality of images according to a user command.

The image displayed on the first area may be at least one image which has not been displayed on the second area.

According to another exemplary aspect of the present invention, there is provided an electronic picture frame including a display unit, a signal processing unit which processes a plurality of images so that the plurality of images are scrolled through and displayed on a first area of the display unit, and a control unit which controls the signal processing unit to display one of the plurality of images, which are being scrolled through, on a second area of the display unit.

The plurality of images displayed on the first area may be thumbnail images which have a smaller size than the image displayed on the second area.

The control unit may control the signal processing unit to display an image displayed at a preset position of the first area from among the plurality of images, which are being scrolled through, on both the first area and the second area of the screen for a preset period of time.

The electronic picture frame may further include a command input unit which receives a user command to change the number of images displayed on the first area.

The control unit may control the signal processing unit to display at least one of images which have been displayed on the second area and images which have not been displayed on the second area on the first area.

The control unit may control the signal processing unit so that an image at a particular position from among the plurality of images is enlarged, moved to the second area, and displayed on the second area, and the process of enlarging and moving the image at the particular position may be shown gradually.

The control unit may control the signal processing unit to change at least one of a direction and rate of scrolling through the plurality of images according to a user command.

The control unit may control the signal processing unit to display at least one image, which has not been displayed on the second area, on the first area.

According to another exemplary aspect of the present invention, there is provided an image display method for an electronic picture frame, the method including reading out images from a plurality of storage areas, and displaying the images read out from each of the plurality of storage areas on a respective display area of a screen.

In the displaying operation, the images may be displayed using at least one of a first display method of displaying a single image on a single display area in a fixed way and a second display method of displaying a plurality of images sequentially on a single display area.

The method may further include receiving a user command to select a storage area which is capable of providing images, wherein in reading out the images, the selected storage area is accessed to read out the images.

The displaying operation may include decoding the images stored in the plurality of storage areas alternately so that the images stored in each of the plurality of storage areas can be displayed on a respective display area.

The displaying operation may further include performing signal processing so that the position and size of the decoded images change gradually when the images are displayed on the plurality of display areas.

According to another exemplary aspect of the present invention, there is provided an electronic picture frame including a signal processing unit which performs signal processing of images read out from a plurality of storage areas, and a control unit which controls the signal processing unit to display the images read out from each of the plurality of storage areas on a respective display area of a screen.

The control unit may control the signal processing unit to display the images using at least one of a first display method of displaying a single image on a single display area in a fixed way and a second display method of displaying a plurality of images sequentially on a single display area.

The electronic picture frame may further include a command input unit which receives a user command to select a storage area which is capable of providing images, wherein the control unit accesses the selected storage area to read out the images.

The control unit may control the signal processing unit to decode the images stored in the plurality of storage areas alternately so that the images stored in each of the plurality of storage areas can be displayed on a respective display area.

The control unit may control the signal processing unit to change the position and size of the decoded images gradually when the decoded images are displayed on the plurality of display areas.

BRIEF DESCRIPTION OF THE DRAWINGS

The above and/or other aspects of the present invention will be more apparent by describing certain exemplary embodiments of the present invention with reference to the accompanying drawings, in which:

FIG. 6 is a flow chart illustrating a method for displaying different images on a screen using the electronic picture frame described with reference to FIGS. 3A to 3C.

DETAILED DESCRIPTION OF EXEMPLARY EMBODIMENTS OF THE INVENTION

Figure 1:
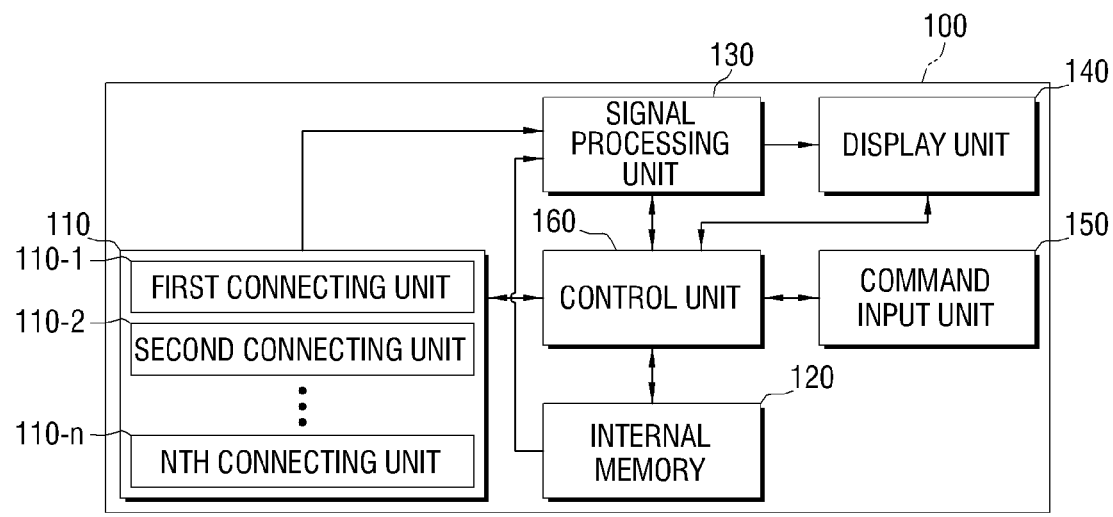
FIG. 1 is a schematic block diagram of an electronic picture frame according to an exemplary embodiment of the present invention.

Certain exemplary embodiments of the present invention will now be described in greater detail with reference to the accompanying drawings.

In the following description, like drawing reference numerals are used for like elements, even in different drawings. The matters defined in the description, such as detailed construction and elements, are provided to assist in a comprehensive understanding of the invention. However, the present invention can be practiced without those specifically defined matters. Also, well-known functions or constructions are not described in detail since they would obscure the invention with unnecessary detail.

FIG. 1 is a schematic block diagram of an electronic picture frame according to an exemplary embodiment of the present invention.

Referring to FIG. 1, the electronic picture frame 100 includes an external memory connecting unit 110, an internal memory 120, a signal processing unit 130, a display unit 140, a command input unit 150, and a control unit 160.

The external memory connecting unit 110 includes a first connecting unit 110-1, a second connecting unit 110-2, . . . , and an Nth connecting unit 110-n, and each connecting unit 110-1, 110-2, . . . , and 110-n may be connected to a respective external memory such as a Secure Digital (SD) memory, a Compact Flash (CF) memory, or a Universal Serial Bus (USB) memory. In such an external memories, images such as photos may be compressed and stored into Joint Photographic Experts Group (JPEG), bitmap, or Graphics Interchange Format (GIF) formats. In addition, the external memory connecting unit 110 may be connected directly to an external device in which images are stored such as a personal computer or a digital camera.

The internal memory 120 stores programs and various data to operate the electronic picture frame 100, and stores images such as photos in JPEG format.

The signal processing unit 130 decodes images stored in an external memory which is connected to the external memory connecting unit 110, or in the internal memory 120. If an image stored in the external memory or the internal memory 120 is a photo, the photo may have been mostly compressed in JPEG format and stored, in which case the signal processing unit 130 decodes the JPEG image. Subsequently, according to the control of the control unit 160, the signal processing unit 130 performs scaling and splitting so that the image can be displayed in a user's desired form.

The display unit 140 displays the image output by the signal processing unit 130. The image may be displayed on the display unit 140 in diverse forms as illustrated in FIGS. 2A to 3C. The display unit 140 may display images using Low Voltage Differential Signaling (LVDS), Transistor Transistor Logic (TTL), or an analog RGB method.

The command input unit 150 receives user commands to control the operation of the electronic picture frame 100 and transmits the user commands to the control unit 160. The command input unit 150 may include button keys or touch keys to input user commands, may receive user commands from a remote control (not shown), or may be a touch panel which is coupled with the display unit 140. Using such a command input unit 150, the user selects a memory or folder in which a desired image is stored and selects an image display method supported by the electronic picture frame 100.

The control unit 160 controls the operation of the electronic picture frame 100 according to a user command input received through the command input unit 150. That is, control unit 160 controls the signal processing unit 130 and the display unit 140 to display images, which are stored in external memories connected to the external memory connecting unit 110 or the internal memory 130, on the display unit 140 using an image display method selected by a user command. This operation of the control unit 160 will be described in more detail below.

FIGS. 2A to 2G illustrate a function for displaying images using an electronic picture frame according to an exemplary embodiment of the present invention.

Figure 2A:
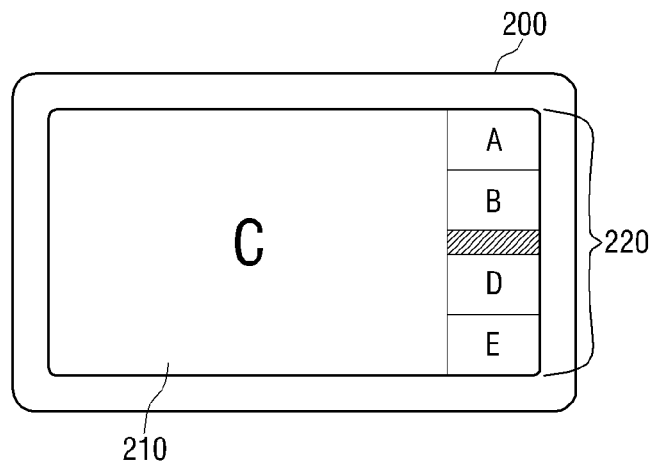
FIGS. 2A to 2G illustrate a function for displaying images using an electronic picture frame according to an exemplary embodiment of the present invention.

Referring to FIG. 2A, the screen 200 consists of a main screen 210 and a thumbnail screen 220. Images stored in a selected memory are displayed as thumbnails on the thumbnail screen 220. Exchangeable image file format (EXIF) information related to the thumbnails may be displayed on the thumbnail screen 220 with the thumbnails. The thumbnail screen 220 may be scrolled up or down. While the thumbnail screen 220 is being scrolled, image C in a preset position of the thumbnail screen 220 is enlarged and displayed on the main screen 210. In FIG. 2A, the preset position is represented as a hatched area. A thumbnail image is a smaller image than an image displayed on the main screen 210.

Figure 2B:
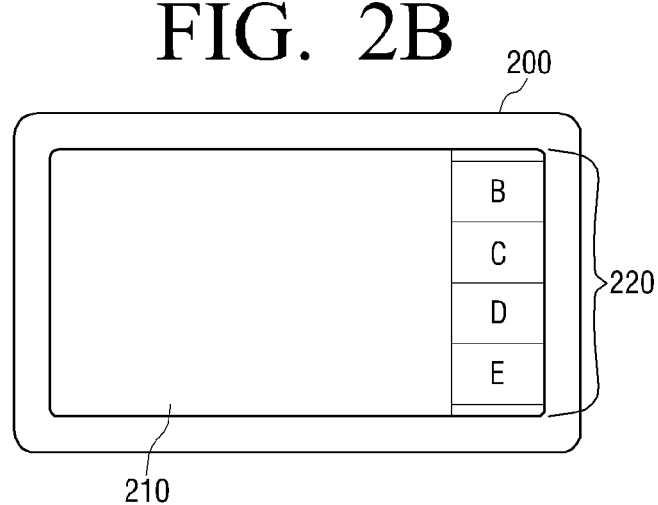
Figure 2C:
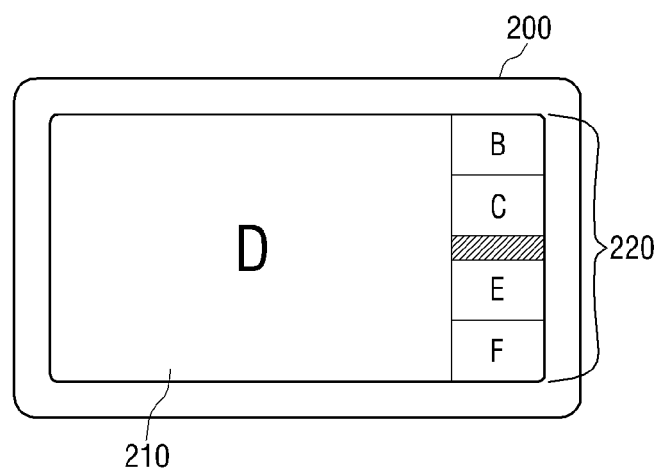

Referring to FIG. 2B, if the thumbnail screen 220 continues to be scrolled down, image C displayed on the main screen 210 in FIG. 2A is displayed again on the thumbnail screen 220. In FIG. 2C, if the thumbnail screen 220 continues to be scrolled down, image D in the preset position of the thumbnail screen 220 is enlarged and displayed on the main screen 210. On the main screen 210, as soon as image C disappears, image D appears. Alternatively, no image may be displayed on the main screen 210 until the thumbnail screen 220 is scrolled down and image D following image C is positioned in the center of the thumbnail screen 220.

Alternatively, the image at the center of the thumbnail 220 may be gradually enlarged and displayed on the main screen 210. In addition, the image displayed on the main screen 210 may be gradually reduced and displayed on the thumbnail screen 220.

The thumbnail screen 220 in FIGS. 2A to 2C may also be scrolled up. Scrolling may be performed automatically, or may be performed in a direction which is selected by a user command. The number of images displayed on the thumbnail screen 220 may be set according to a user command.

In FIGS. 2A to 2C, an image at a preset position on the thumbnail screen 220 disappears while being displayed on the main screen 210. However, it is also possible that an image continues to be displayed at the preset position of the thumbnail screen 220 while also being displayed on the main screen 210. When the thumbnail screen 220 is being scrolled, following thumbnail images appear on and disappears from the thumbnail screen 220 according to the direction in which the thumbnail screen 220 is scrolled.

If the screen 200 is initially displayed according to a user command, thumbnail images may be displayed on the thumbnail screen 220, but no image may be displayed on the main screen 210. The thumbnail images displayed on the thumbnail screen 220 include images which have been displayed on the main screen 210 and images which are not displayed on the main screen 210.

Figure 2D:
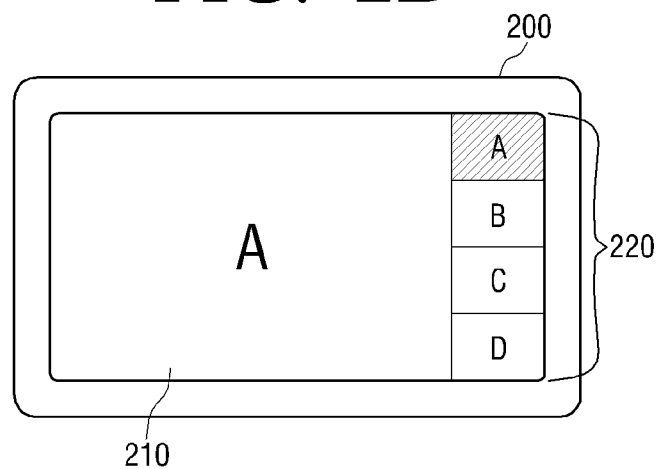
Figure 2E:
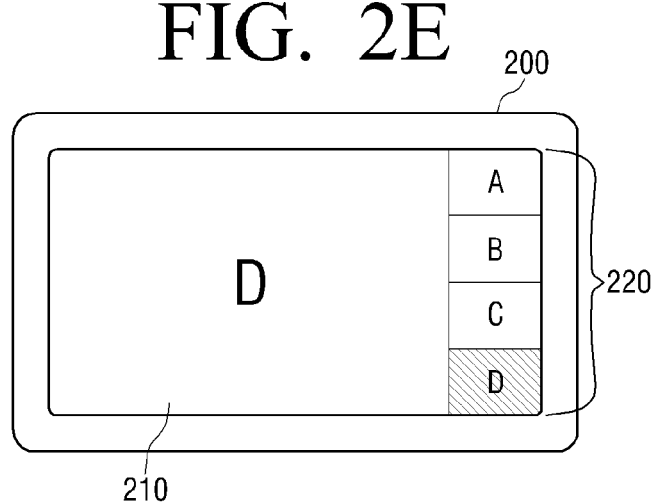

FIGS. 2D and 2E illustrate that the position of an image on the thumbnail screen 220 to be displayed on the main screen 210 may vary according to the direction to which the thumbnail screen 220 is scrolled. That is, as illustrated in FIG. 2D, if the thumbnail screen 220 is scrolled down, image A on a preset position of the thumbnail screen 220 indicated by hatching is displayed on the main screen 210. Since the thumbnail screen 220 is scrolled down, the image A disappears simultaneously from both the main screen 210 and the thumbnail screen 220. However, if the thumbnail screen 220 is scrolled up, the image A is displayed simultaneously on both the main screen 210 and the thumbnail screen 220.

In FIG. 2E, if the thumbnail screen 220 is scrolled down, image D on a preset position of the thumbnail screen 220 indicated by hatching is displayed on the main screen 210. Since the thumbnail screen 220 is scrolled down, the image D is displayed concurrently on both the main screen 210 and the thumbnail screen 220. However, if the thumbnail screen 220 is scrolled up, the image D disappears simultaneously from both the main screen 210 and the thumbnail screen 220.

Figure 2F:
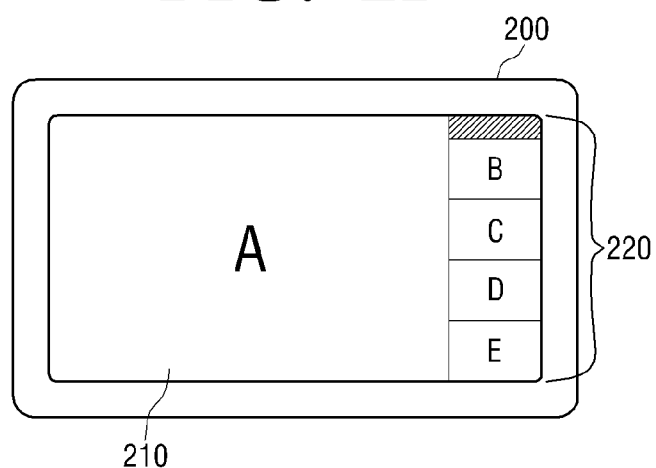
Figure 2G:
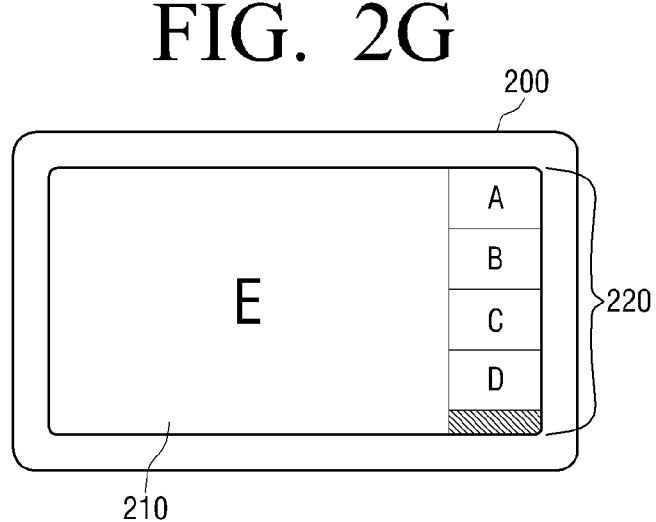

FIGS. 2F and 2G illustrate that an image at a preset location of the thumbnail screen 220 disappears from the thumbnail screen 220 while being displayed on the main screen 210.

In FIGS. 2A to 2G, the thumbnail screen 220 is positioned vertically on the right of the screen 200, but it may also be positioned vertically on the left of the screen 200, or horizontally on the upper or lower portion of the screen 200. If the thumbnail screen 220 is positioned horizontally on the upper or lower portion of the screen 200, the thumbnail screen 220 may be scrolled to the right or left.

The preset position on the thumbnail screen 220 may vary according to a user command, and the scrolling rate may vary according to a user command.

In FIGS. 2A to 2G, thumbnail images to be displayed on the thumbnail screen 220 are images provided by a plurality of storage areas, which are memories or folders.

Figure 3A:
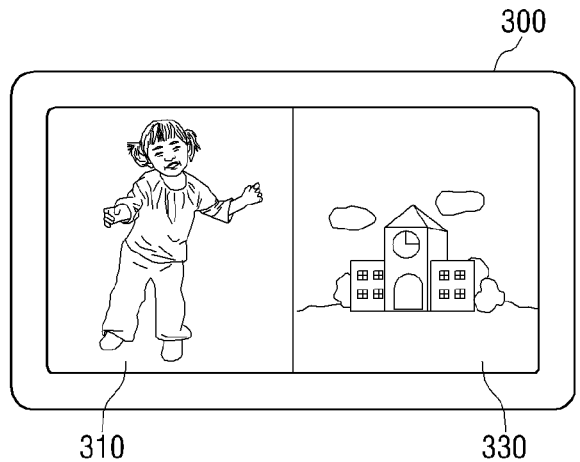
FIGS. 3A to 3C illustrate a function for displaying different images on screen using an electronic picture frame according to an exemplary embodiment of the present invention.
Figure 3B:
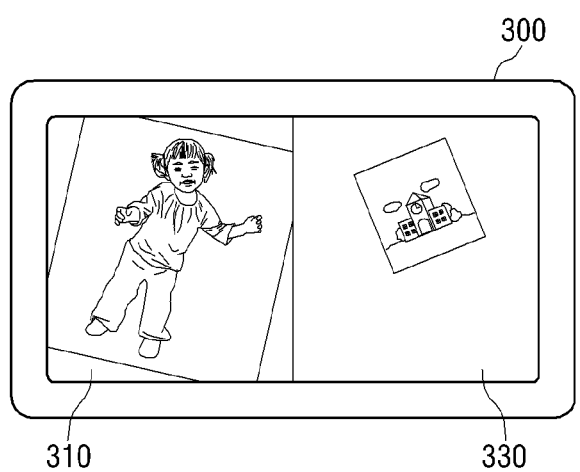
Figure 3C:
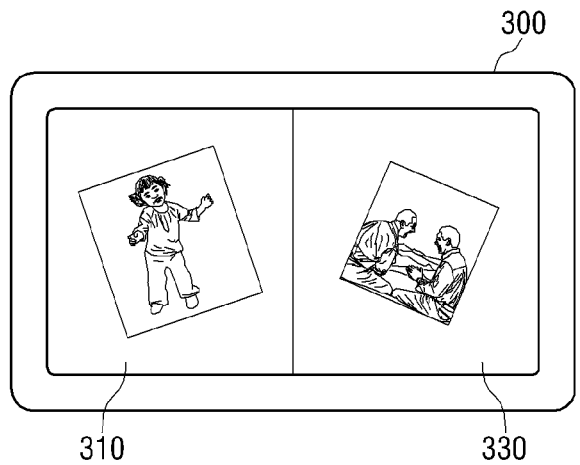

FIGS. 3A to 3C illustrate a function for displaying different images on a screen using an electronic picture frame according to an exemplary embodiment of the present invention.

Referring to FIG. 3A, the screen 300 consists of a first display area 310 and a second display area 330. Each display area 310 and 330 may display images which are stored in different memories. For example, the user may sequentially display the images stored in an SD memory which is connected to the external memory connecting unit 110 on the first display area 310, and may sequentially display the images stored in the internal memory 120 on the second display area 330. On both the first display area 310 and the second display area 330 the images are displayed in a sliding manner.

Alternatively, as illustrated in FIGS. 3B and 3C, the process of reducing and enlarging the images on the first display area 310 and the second display area 330 may be gradually expressed. For example, as illustrated in FIGS. 3B and 3C, the user selects a CF memory and a USB memory which are connected to the external memory connecting unit 110 so that the images which are stored in the CF memory and the USB memory can be displayed on the first display area 310 and the second display area 330, respectively.

An image stored in the CF memory is gradually enlarged, moved, and displayed on the first display area 310. The image is then gradually reduced and moved, and disappears from the first display area 310. Another image stored in the CF memory is displayed on the first display area 310 in the same manner. On the second display area 330, the images are displayed in the same manner. In this manner, the images alternately appear on and disappear from the first display area 310 and the second display area 330.

In FIGS. 3A to 3C, the screen 300 consists of the two display areas 310 and 330, but the screen 300 may consist of three or more display areas. In this case, the three or more display areas may display images stored in three or more memories, respectively.

Furthermore, in FIGS. 3A to 3C, the user selects desired memories. However, it is possible that, various kinds of images are categorized differently and stored separately in a plurality of folders in a single memory, and that one of the plurality of folders may be selected and displayed on the first display area 310 and another folder may be selected and displayed on the second display area 330.

Figure 4:
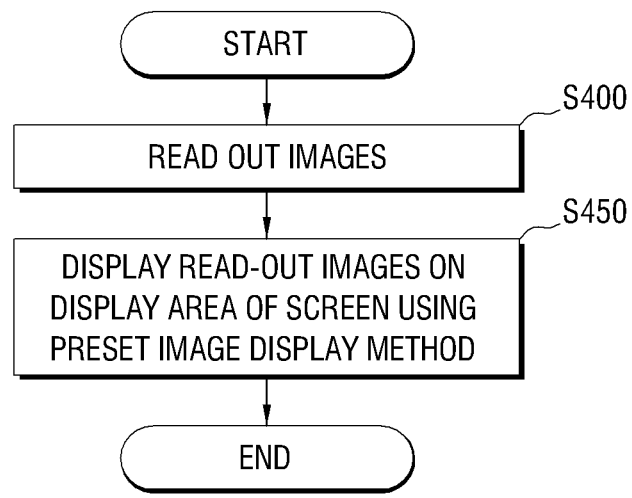
FIG. 4 is a flow chart illustrating the operation of an electronic picture frame according to an exemplary embodiment of the present invention.

FIG. 4 is a flow chart illustrating the operation of an electronic picture frame according to an exemplary embodiment of the present invention.

As illustrated in FIG. 4, the electronic picture frame 100 reads out images (S400), and displays the images on a display area of the screen using a preset image display method (S450). That is, the control unit 160 reads out images to be displayed on the screen from a memory including the images from among external memories which are connected to the external memory connecting unit 110 and the internal memory, and then controls the signal processing unit 130 and the display unit 140 to display the read-out images on the screen using the method described with reference to FIGS. 2A to 2C or the method described with reference to FIGS. 3A to 3C.

By this process, the user can see the images displayed in diverse methods via the electronic picture frame 100.

Figure 5:
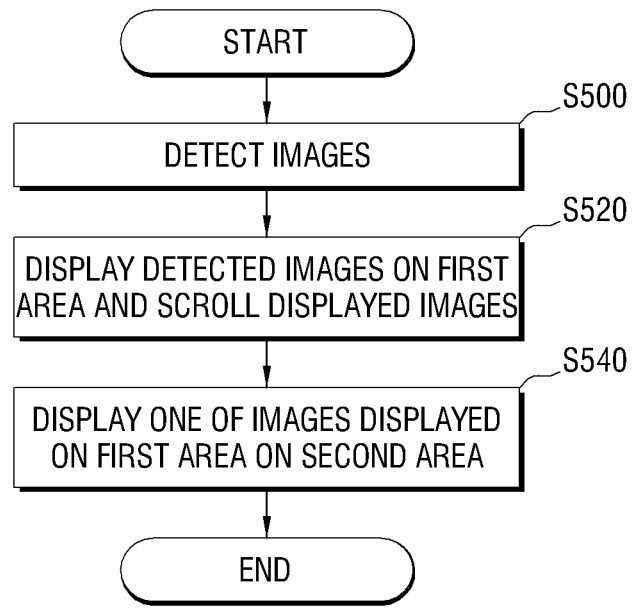
FIG. 5 is a flow chart illustrating a method for displaying images using the electronic picture frame described with reference to FIGS. 2A to 2G.

FIG. 5 is a flow chart illustrating a method for displaying images using the electronic picture frame described with reference to FIGS. 2A to 2G.

As illustrated in FIG. 5, the control unit 160 detects images (S500), and controls the signal processing unit 130 and the display unit 140 to display the detected images on a first area and scrolls through the displayed images (S520). That is, as illustrated in FIGS. 2A to 2C, the detected images are displayed as thumbnails on the thumbnail screen 220, and the thumbnail screen 220 is scrolled through.

Subsequently, the control unit 160 controls the signal processing unit 130 and the display unit 140 to display one of the images that is displayed on the first area on a second area (S540). That is, as illustrated in FIGS. 2A to 2C, while the thumbnail screen 220 is being scrolled, image C at the center of the thumbnail screen 220 is enlarged and displayed on the main screen 210.

FIG. 6 is a flow chart illustrating a method for displaying different images on screen using the electronic picture frame described with reference to FIGS. 3A to 3C.

As illustrated in FIG. 6, storage areas are selected according to a user command (S600) and an image display method is selected (S620). That is, the user selects a memory, in which the desired images are stored from among the memories connected to the external memory connecting unit 110 and the internal memory 120, and selects a method for displaying the images in the selected storage area. For example, the user may select the images stored in a USB memory to be displayed on the first display area and may select the images stored in a CF memory to be displayed on the second display area.

Subsequently, the signal processing unit 130 decodes the images stored in the selected storage area (S640), and the display unit 140 displays the decoded images on the screen using the selected image display method (S660). In other words, the control unit 160 controls the signal processing unit 130 to decode the images stored in the selected memory and performs scaling and splitting of the decoded images. Consequently, the images in the USB memory can be processed by the signal processing unit 130 and displayed on the first display area, and the images in the CF memory can be processed by the signal processing unit 130 and displayed on the second display area.

In FIG. 6, memories are selected as storage areas, but a plurality of folders in which various kinds of images are categorized differently may be selected as storage areas.

As can be appreciated from the above description of an electronic picture frame, images are displayed in diverse forms so that the user can view the images in an interesting way, and the user can view images distributed in various types of memories in a desired way.

The foregoing exemplary embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An image display method for an electronic picture frame, the method comprising:
 displaying, under a control of a processor, a plurality of images on a first area of a screen;
 scrolling through the plurality of images on the screen; and
 automatically displaying at least one of the plurality of images, which are being scrolled through, on a second area of the screen,
 wherein, when the at least one image reaches a preset location on the first area, the at least one image appears in the second area and disappears from the first area of the display.

2. The method of claim 1, wherein each of the plurality of images displayed on the first area are smaller in size than the at least one of the plurality of images displayed on the second area.

3. The method of claim 2, wherein the plurality of images are thumbnail images.

4. The method of claim 3, wherein the plurality of images have exchangeable image file format (EXIF) information related to the thumbnail images.

5. The method of claim 1, wherein the at least one of the plurality of images is displayed on both the first area and the second area of the screen for a preset period of time.

6. The method of claim 1, further comprising:
 changing a number of images displayed on the first area according to a user command.

7. The method of claim 1, wherein the plurality of images displayed on the first area comprises images which have been displayed on the second area, and images which have not been displayed on the second area.

8. The method of claim 1, wherein in displaying at least one of the plurality of images, which are being scrolled through, on the second area of the screen, an image at a particular position from among the plurality of images is enlarged in an enlarging, moved to the second area in a moving, and displayed on the second area.

9. The method of claim 8, wherein in displaying at least one of the plurality of images, which are being scrolled through, on the second area of the screen, the enlarging and the moving the image at the particular position is shown gradually.

10. The method of claim 1, further comprising:
 changing a direction of scrolling through the plurality of images according to a user command.

11. The method of claim 1, further comprising:
 changing a rate of scrolling through the plurality of images according to a user command.

12. The method of claim 1, wherein the plurality of images displayed on the first area comprises at least one image which has not been displayed on the second area.

13. The image display method of claim 1, wherein number of images to be displayed in the first area of the screen is preset by a user.

14. The image display method of claim 1, wherein, when the at least one image disappears from the first area, a preset order position of the at least one image with respect to the plurality of images displayed in the first area is represented in the first area without the at least one image.

15. The image display method of claim 1, wherein the second area of the screen displays one image at a time and wherein the first area of the screen continuous to display the plurality of images except the at least one image that is displayed in the second area of the screen.

16. An electronic picture frame, comprising:
- a display unit;
- a signal processing unit which processes a plurality of images so that the plurality of images are scrolled through and displayed on a first area of the display unit; and
- a control unit which controls the signal processing unit to automatically display at least one of the plurality of images, which are being scrolled through, on a second area of the display unit,
- wherein, when the at least one image reaches a preset location on the first area, the at least one image appears in the second area and disappears from the first area.

17. The electronic picture frame of claim 16, wherein each of the plurality of images displayed on the first area are smaller in size than the at least one of the plurality of images display on the second area.

18. The electronic picture frame of claim 17, wherein the plurality of images are thumbnail images.

19. The electronic picture frame of claim 18, wherein the plurality of images have exchangeable image file format (EXIF) information related to the thumbnail images.

20. The electronic picture frame of claim 16, wherein the control unit controls the signal processing unit to display at least one of the plurality of images is displayed on both the first area and the second area of the screen for a preset period of time.

21. The electronic picture frame of claim 16, further comprising:
- a command input unit which receives a user command to change a number of images displayed on the first area.

22. The electronic picture frame of claim 16, wherein the control unit controls the signal processing unit to display at least one image which has been displayed on the second area and images which have not been displayed on the second area on the first area.

23. The electronic picture frame of claim 16, wherein the control unit controls the signal processing unit so that an image at a particular position from among the plurality of images is enlarged in an enlarging, moved to the second area in a moving, and displayed on the second area.

24. The electronic picture frame of claim 23, wherein the control unit controls the signal processing unit so that the enlarging and the moving the image at the particular position is shown gradually.

25. The electronic picture frame of claim 16, wherein the control unit controls the signal processing unit to change a direction of scrolling through the plurality of images according to a user command.

26. The electronic picture frame of claim 16, wherein the control unit controls the signal processing unit to change a rate of scrolling through the plurality of images according to a user command.

27. The electronic picture frame of claim 16, wherein the control unit controls the signal processing unit to display at least one image, which has not been displayed on the second area, on the first area.

28. An image display method for an electronic picture frame, the method comprising:
- simultaneously displaying, under a control of a processor, a first sequence of images of a plurality of images in a first area of a screen;
- automatically displaying in a second area, one image of the plurality of images within the first sequence of images, if the one image is in a predetermined area;
- scrolling the plurality of images to simultaneously display a second sequence of images of the plurality of images; and
- displaying in the second area, another image of the plurality of images within the second sequence of images, if the other image is scrolled into the predetermined area,
- wherein, when the at least one image reaches a preset location on the first area, the at least one image appears in the second area and disappears from the first area.

29. The image display method of claim 28, wherein the first area of the screen displays thumbnails of the first and the second sequence of images.

30. The image display method of claim 28, wherein the one image is simultaneously displayed in both the first area and the second area, when the one image is displayed in the second area.

* * * * *